United States Patent [19]

Auriemma

[11] Patent Number: 5,513,102
[45] Date of Patent: Apr. 30, 1996

[54] DATA PROCESSING METHODS OF IMPLEMENTING AN AWARD TO AN AUTHORIZED USER OF A CREDIT CARD

[75] Inventor: Matthew J. Auriemma, New York, N.Y.

[73] Assignee: Auriemma Consulting Group, Inc., Westbury, N.Y.

[21] Appl. No.: 265,070

[22] Filed: Jun. 28, 1994

[51] Int. Cl.[6] .................................................. G06F 19/00
[52] U.S. Cl. ........................................................ 364/408
[58] Field of Search .................................... 364/408, 401

[56] References Cited

U.S. PATENT DOCUMENTS

| | | | |
|---|---|---|---|
| 4,630,844 | 12/1986 | Troy et al. | 364/408 |
| 4,637,634 | 1/1987 | Troy et al. | 364/408 |
| 4,997,188 | 3/1991 | Nilssen | 364/408 |
| 5,082,275 | 1/1992 | Nilssen | 364/408 |
| 5,083,782 | 1/1992 | Nilssen | 364/408 |
| 5,083,784 | 1/1992 | Nilssen | 364/408 |

Primary Examiner—Donald E. McElheny, Jr.
Attorney, Agent, or Firm—Cohen, Pontani, Lieberman, Pavane

[57] ABSTRACT

Data processing methods for enhancing the value of a substantially conventional credit card so as to enhance a user's perception of the desireability of holding and using the card and encourage increased use of the card for its normal utility as a payment device. The user earns, for each transaction amount or payment amount of at least a predetermined size, a coupon redeemable by the user for a lottery ticket by which the user has an opportunity to recover at least a portion and potentially in excess of the user's transaction-based expenditures or payments. Transaction amounts or payment amounts in excess of the predetermined size but insufficient to earn an additional coupon are stored and then applied to user transaction or payment amounts during the next-subsequent billing period.

4 Claims, 4 Drawing Sheets

AWARD COUPON

REDEEMABLE FOR ONE (1)
NEW YORK STATE LOTTERY TICKET

ISSUED TO: JOHN SMITH
12 OCEAN ST.
ANYTOWN N.Y.

DATA PROCESSING METHODS OF IMPLEMENTING AN AWARD TO AN AUTHORIZED USER OF A CREDIT CARD

FIELD OF THE INVENTION

The present invention is directed to credit cards or bank cards and the like and, more particularly, to methods for enhancing the value of a substantially conventional credit card— both to a holder or user of the card and to the bank or other issuer of the card.

BACKGROUND OF THE INVENTION

Credit cards—i.e. devices, most commonly represented by a plastic card-like member through the use of which an authorized user pays for, by way of example, purchases of services and/or merchandise and the like—have become so universally well known and ubiquitous as to have fundamentally changed the very manner in which financial transactions and dealings are viewed and conducted in society today. Such credit cards are generally issued by a bank and provide a mechanism by which a user purchases goods without an immediate, direct exchange of cash and thereby incurs debt which the user may thereafter (i.e. upon receipt of a monthly or otherwise periodic statement) either pay the outstanding balance or, as a matter of choice, defer the balance for later payment with accompanying interest or finance charges for the period during which payment of the debt is deferred.

Increasingly, credit cards are being issued by banks and the like in association with another organization such, for example, as commercial enterprises which themselves offer or sell goods and/or services. This phenomenon, known as co-branding, provides a credit card that typically carries the name of a commercial company, with the commercial company or co-branding "partner" bringing to the card holder or user added benefits which, not incidentally, will generally assist the partner in the sale of its goods or services to the card user. Well known and successful examples of such co-branded cards include the General Motors MasterCard credit card—offering users up to a five-percent rebate on user-purchased General Motors automobiles, based on the volume of charges placed on the user's card—and airline-partnered credit cards which award the card user frequent flyer mileage on the basis of user-accrued card charges.

Current co-branded credit cards, although successful, may nevertheless lack additional actual or perceived advantages, to the user and/or to the issuer and/or commercial partner, which may perhaps otherwise be available or attainable. For example, the rapid proliferation of co-branded cards offering seemingly ever-increasing amounts or levels of user-earned "benefits" encourages individual users or subscribers to obtain multiple credit cards, by which users often correspondingly split or divide their purchases and transactions— previously charged on a single card—between a number of cards, thereby decreasing the transaction volume of each card at the expense of one or more others. Moreover, permitting users to "earn" awards based on purchases encourages users to incur increasing amounts of debt, at times exceeding the amount that a user is reasonably capable of repaying in a timely manner, increasing the possibility of user default with consequent damage to the bank, to the commercial partner, and/or to the organization whose goods or services were charged in the user's transactions with the card.

It is accordingly the desideratum of the invention to provide methods for enhancing the value of a substantially conventional credit card so as to enhance a user's or potential user's perception of the desireability of holding or subscribing to the card and encourage increased use of the card for its normal utility as a payment device, all without the disadvantages of the prior art.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PREFERRED EMBODIMENTS

Figure 1:
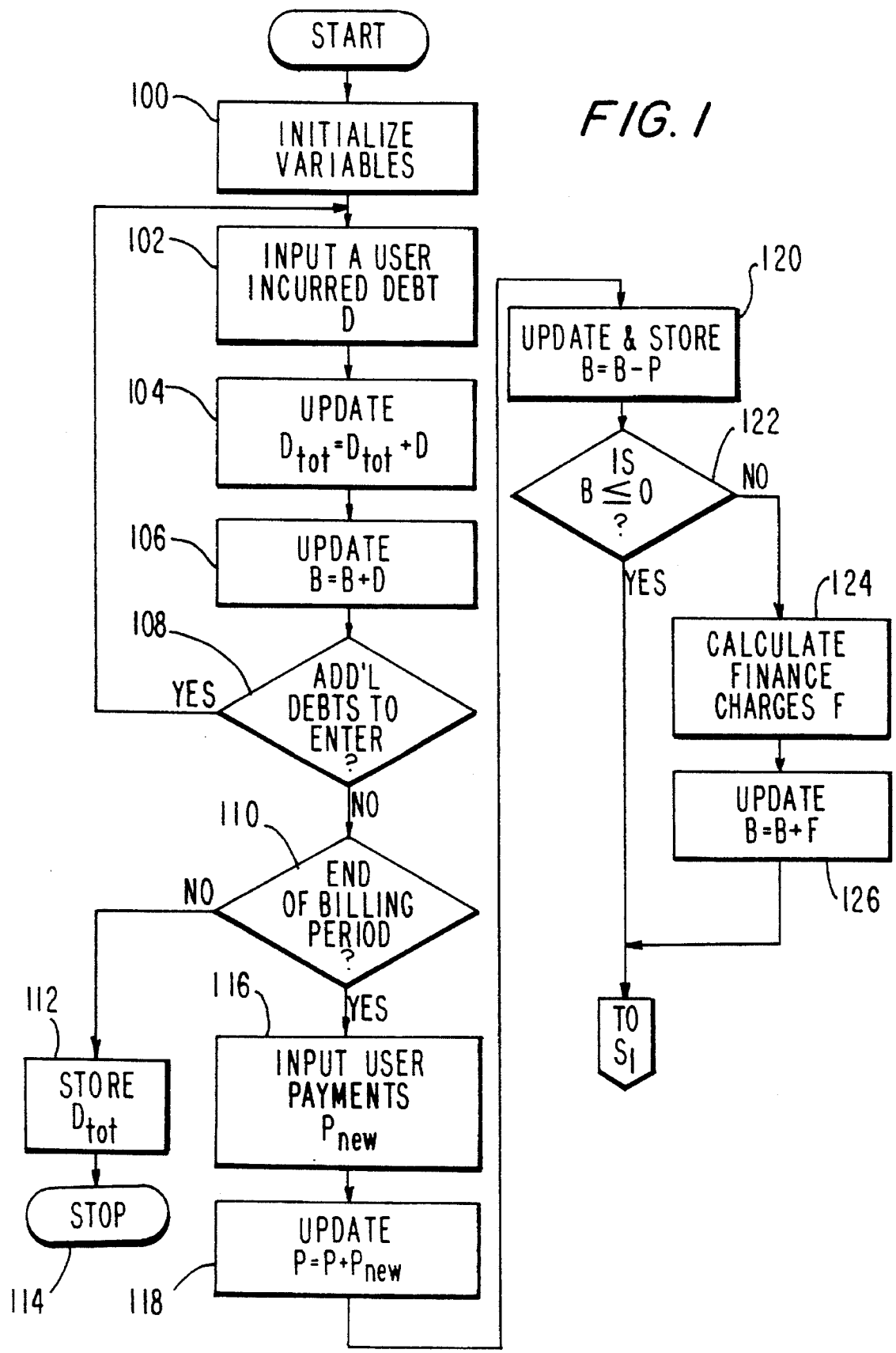
FIG. 1 is a flow chart depicting a first portion of various data processing methods implemented in accordance with the teachings of the present invention.

The present invention is broadly directed to methods for enhancing the value of a substantially conventional credit card or bank card so as to enhance a user's or potential user's perception of the desireability of holding or subscribing to the card and encourage increased use of the card for its normal utility as a payment device through which the user incurs debt. As used herein, the term debt is intended to collectively encompass all monetary obligations incurred by an authorized user of the card and all monies owed to the issuer of the card for any and all forms of credit presently or hereinafter extendible to the user of or subscriber to the card's services such, by way of nonexclusive example, as for services and merchandise purchases, cash advances or loans, subscription fees, and applied finance charges and the like. Similarly, the term finance charges should be understood as including, again by way of nonlimiting example, late fees, interest charges, bank fees and all other charges and assessments added to those debts directly incurred by a user through transactions such as purchases and cash advances and the like, such finance charges most commonly resulting from the user's decision to extend an outstanding balance due as of a particular billing period closing date. Furthermore, any general or special purpose credit or bank card or similar or equivalent instrument or mechanism, whether or not represented or implemented in the form of a physical card or member or the like, through or in accordance with which an authorized user executes a transaction (and thereby incurs debts) with an obligation to repay to the card or instrument issuer or sponser is intended to be subsumed, for purposes of this disclosure, under the term credit card as used herein.

The intended utility and functionality of the invention may be implemented in accordance with several alternatively-applied and currently-preferred methods having a substantial commonality. In its broadest sense, the invention provides methods by which an authorized user's or subscriber's use of the credit card, i.e. the incurring of debts through normal use of the card, generates or results in an award credit which is used as the basis for the pro rata issuance of coupons or vouchers that are redeemable by the user. These coupons are more particularly redeemable for lottery tickets of the type which are currently being issued in a number of forms by or under the authority of most States in this country. These various States run numerous different lottery "games", one common theme of which is that a ticket or entry in the game has a generally random and statistically-calculatable chance of being selected or otherwise being deemed or denominated a winning entry. Many of the games require that the user select a fixed plurality of numbers within a predetermined finite numerical range for matching against a like plurality of numbers that are thereafter randomly-selected by an appointed agent of the State. The methods of the present invention advantageously permit a credit card user who has "earned" one or more coupons through use of the card to personally select the particular lottery game(s) in which to participate and, where appropriate, the particular numbers to played in the game.

In any event, each such lottery ticket represents, as is well known, a chance or opportunity for the ticket holder to win a range of sums of money that will often vary within a given game, in accordance with its rules, from as little as (or less than) one to literally millions of dollars.

The methods of the present invention may thus be seen as providing an authorized user of a credit card, who incurs debts on or with the card, with an award (i.e. one or more coupons or vouchers exchangeable for lottery tickets) that itself represents an opportunity—an opportunity, on the basis of the debts incurred with the card, to recover at least a portion and, potentially, substantially in excess of the total amount of the incurred debts. The greater the card-based debts incurred, the greater the number of coupons (redeemable or exchangeable for lottery tickets) "earned" and, correspondingly, the greater the user's statistical chance of recovering (through the lottery games) at least a portion of the incurred debts. Thus, in another sense the invention provides methods of encouraging increased use of an issuer's credit card by providing the user with an opportunity to recover at least a portion of the incurred debts, since the opportunity and likelihood of recovery increase with increasing amounts of card-based debt. In still another sense, the present invention provides gaming methods involving the incurring of debts on or with credit cards and the award of gaming opportunities with increasing likelihoods of an award resulting from increased numbers of user-initiated transactions.

Figure 2A:
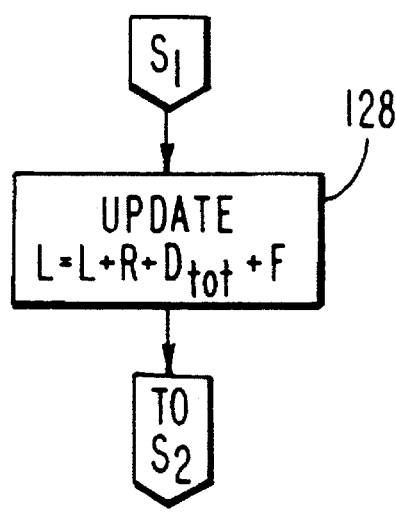
FIG. 2A is a flow chart depicting a second portion of a first embodiment of a data processing method in accordance with the invention.
Figure 2C:
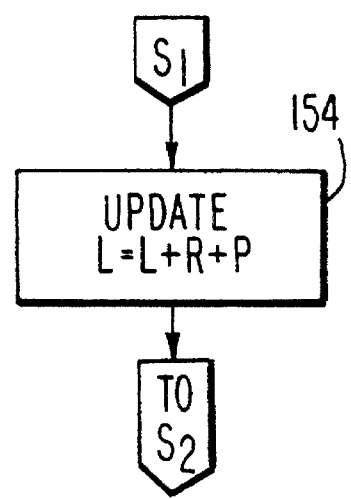
FIG. 2C is a flow chart depicting a second portion of a third embodiment of a data processing method in accordance with the invention.
Figure 2B:
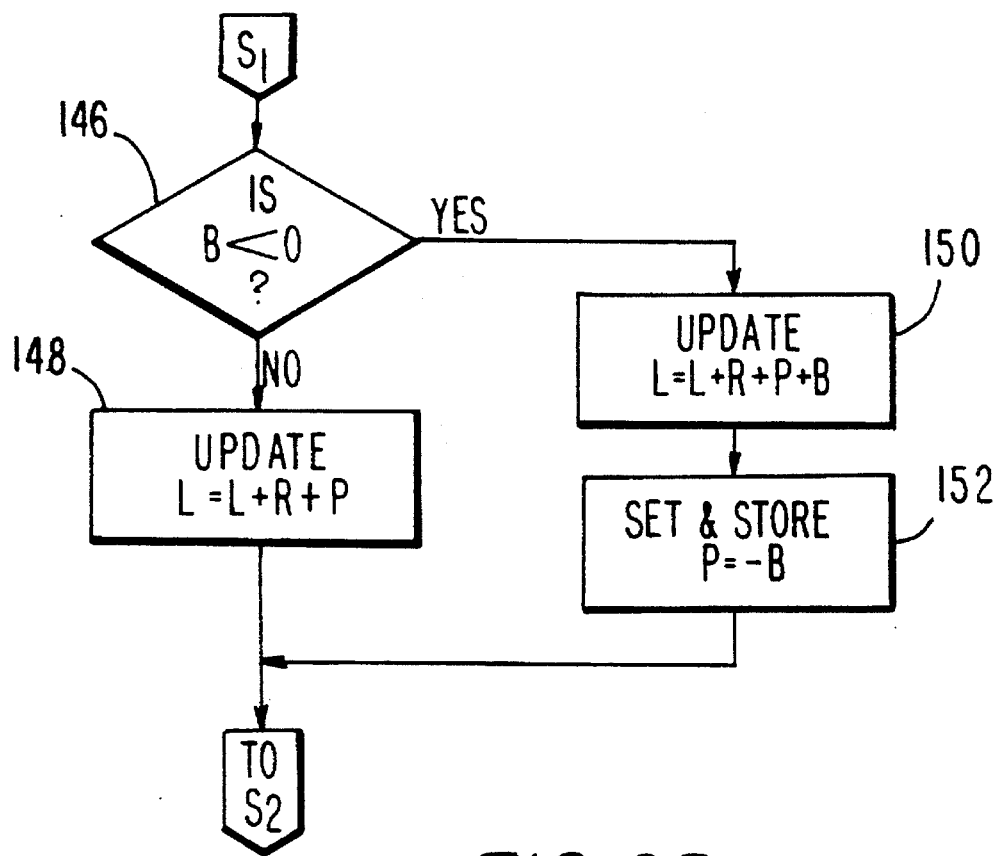
FIG. 2B is a flow chart depicting a second portion of a second embodiment of a data processing method in accordance with the invention.
Figure 3:
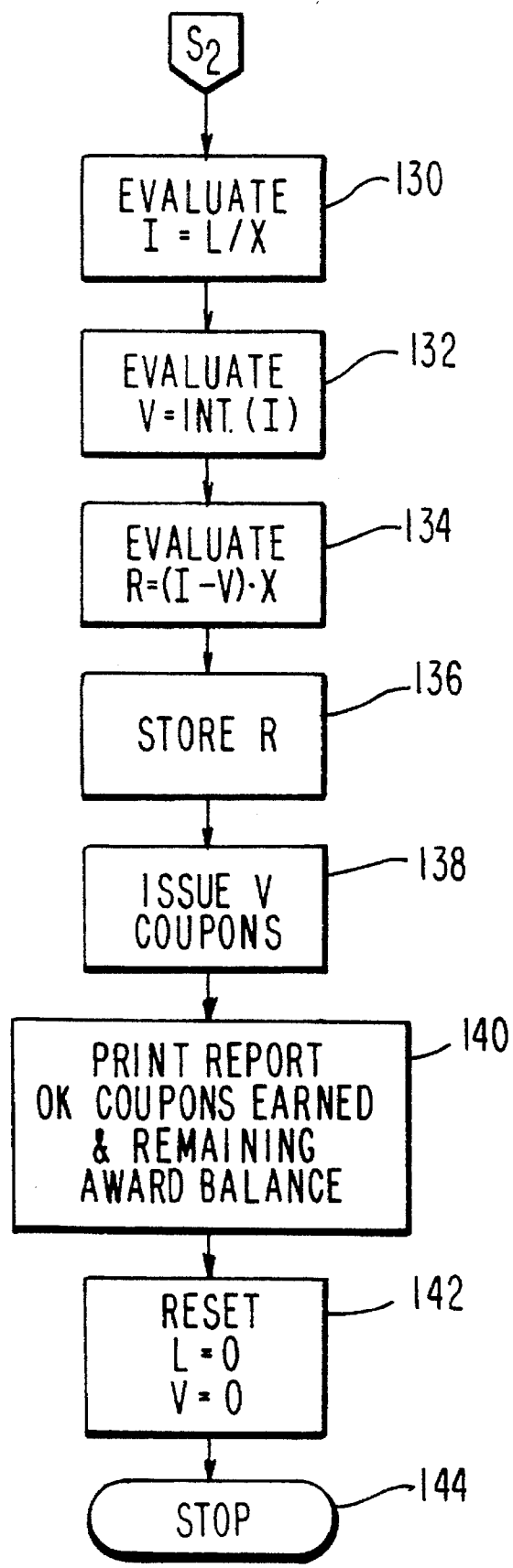
FIG. 3 is a flow chart depicting a third portion of various data processing methods implemented in accordance with the present invention.

With the foregoing overview in mind, the detailed operation of the inventive methods— at least the major portion of which is generally contemplated as being implemented in or on a data processing system of conventional construction or otherwise provided or prepared in accordance with the normal abilities of those skilled in the pertinent arts—will best be understood by reference to the flow charts of FIGS. 1 to 3 in conjunction with the following discussion.

Referring initially to FIG. 1, it should first be noted that it is common in the credit card industry that users or subscribers are billed on a periodic basis, most typically once a month, by the generating of a billing statement itemizing the debts incurred during the preceding period, listing any new finance charges assessed or due on the new debts and any existing carry-over balance from the preceding billing period, and providing an indication of the total amount that the user now owes to the issuer of the credit card and of a minimum amount or portion of that total that must be paid by a particular due date. It is accordingly assumed, for purposes of and to facilitate the following description of the currently preferred embodiments of the invention, that the method steps hereinafter described are for the most part practiced at or soon after each billing period closing date. Nevertheless, those skilled in the art will readily recognize and appreciate that the disclosed methods are subject to and may be suitably modified, as general matters of design choice, to accommodate different billing periods and procedures and/or different manners of entering or recording incurred debts of and received payments from a user of the card. For example, although in this description it has generally been assumed that all debts incurred by a user during the billing period or cycle are entered into the data processing system on a bulk processing basis shortly after the billing period closing date, the invention is equally applicable to (and, indeed, includes accommodation for) implementations in which the individual debts or transactions are dynamically entered throughout the billing period and only those actions required to generate the end-of-period statement and to distribute to the user the appropriate number of earned coupons that are redeemable for lottery tickets are effected shortly after the closing date. All such modifications should in any event be understood as being within the fully intended scope and contemplation of the invention.

With particular reference, then, to FIG. 1, the variables assigned in accordance with the herein-disclosed methods are initialized at block 100. In this first-described embodiment of the invention, those variables include an outstanding or existing balance B which represents the monetary amount or total debt currently owed by the user by virtue of the user's use of the card; a variable P representing the total payments received by the credit card administrator or bank from or on behalf of the user or otherwise to be applied as a credit in the current billing period; a variable F representing the finance charges assessed against the user at the end of the current billing period; a variable D representing each debt, other than finance charges, incurred by the user through use of the credit card and a related variable $D_{tot}$ representing the sum or total of all debts D incurred by the user during the current billing period; a variable L representing an eligible award balance, which is the total dollar amount upon which is based the determination of the number or value of coupons earned by the user during the current billing period; a variable V representing the number or value of coupons earned by the user during the current billing period; and a variable R representing a remaining eligible award balance to be carried over into the next or succeeding billing period.

At block 100, the variable D is initialized to zero. The stored values of the variables B and R from the previous billing period are retrieved from system memory or data storage. Each of the variables P, V, L and F is either set to zero or, where a non-zero value has been stored as a result of activity prior to or during the current billing period, is initialized with the stored value. For example, the variable P may already contain the sum of any payments received or credits applied to the user's account during the current billing period. The variables V and/or L may contain values representing coupons or eligible credits earned by or awarded to the user during the current billing period for user activity other than that corresponding to the incurring of card-related debt such, by way of example, as in special promotions or the like. And the variable F may already contain previously-unbilled finance charges for assessments other than those based on an overdue or outstanding debt balance, such as for annual card fees. Where all data entry and processing is carried out en masse shortly after the end of the billing period (i.e. bulk processing), the variable $D_{tot}$ is set to zero at block 100; where, on the other hand, user-incurred debts are entered dynamically throughout the billing period (i.e. transaction processing) to create a dynamically-updated running total debt, the previously-stored value of $D_{tot}$ is retrieved from data storage.

Following the initialization of variables, the individual heretofore-unentered debts D incurred by the user during the billing period are input or entered and summed at blocks 102 to 108. A single incurred debt D is entered at block 102. The entered debt D is then added to the existing total $D_{tot}$ to obtain an updated $D_{tot}$ at block 104 and, at block 106, the outstanding balance B is updated by adding the newly-entered debt D. Block 108 tests whether there are additional debts D to be entered; if so, flow returns to block 102 at which the next debt D is entered and, if not, flow proceeds to block 110.

Blocks 110 to 114 are present to accommodate the use of dynamic (as opposed to bulk) processing of user debts. Block 110 queries whether the current billing period or cycle has ended—i.e. whether, at this time, the remainder of the method relating to, inter alia, the awarding of lottery ticket coupons or vouchers to the user is to be completed. A negative response to the inquiry causes the current value of the variable $D_{tot}$ to be stored (block 112) for subsequent retrieval when additional user debts D are to be entered, and processing then terminates at block 114. For a positive response to the block 110 test, processing proceeds to block 116.

At block 116, newly-received payments and credits $P_{new}$ are input and totalled, and the value of the variable P is updated at block 118 by adding the new payments $P_{new}$ to the current value of variable P. The user's unapplied total payments P is then subtracted from the current outstanding balance B to update the balance B at block 120, and the new balance B is stored for use in the subsequent billing period.

Flow next passes to block 122 at which the value of the new or updated outstanding balance B is tested. If B is determined to be greater than zero—yielding a negative response to the block 122 inquiry and thereby indicating that there remains a non-zero outstanding balance or indebtedness due from the user after all payments and credits have been applied—then processing passes to block 124 at which the applicable finance charges F, if any, are calculated. It should be pointed out that the precise manner in which the finance charges are calculated, and the factors applicable to determining whether any finance charges are to be assessed, is unrelated to and beyond the scope of the present invention and, as such, is neither disclosed nor described herein. Suffice it to say that the processing at block 124 is intended to incorporate whatever calculations and determinations are necessary to evaluate applicable finance charges imposable on the user in the current billing period. The user's outstanding balance B is then updated at block 126 by adding the finance charges F to the then current balance B.

Where either the interrogation at block 122 yields a positive result—indicating that the balance B is less than zero (i.e. the user has paid or received a credit for more than is owed) or equal to zero (i.e. the user's balance has been fully paid)—or, alternatively, after the updating of variable B at block 126, flow passes to that portion of the flow chart depicted in FIG. 2A.

The FIG. 2A portion or routine implements a first embodiment of the inventive method for evaluating the eligible award balance represented by the variable L. In this first implementation, the credit card user is awarded a particular number of coupons or vouchers for lottery tickets based upon the user's total indebtedness resulting from use of the card. It is generally intended and contemplated that the indebtedness will include that which the user owes to the card issuer or bank for both directly-incurred debts D and finance charges F, although finance charges (as well, if desired, as certain particular forms or types of debts) may optionally be excluded as a general matter of design choice. In any event, the value of the variable L is calculated or updated at block 128 by adding, to the then-current value of the variable L, the values held in the variables R, $D_{tot}$ and F.

Processing then continues at block 130 (FIG. 3), at which a temporary variable I is defined by the result of the division of the variable L by a predetermined number X. The number X determines the amount of money—e.g. the dollar amount—for which one coupon or voucher, exchangeable for one lottery ticket, will be awarded to the credit card user. Thus, where for example each lottery ticket normally costs one dollar and it is desired to award a coupon exchangeable for one ticket for each one hundred dollars of user-incurred credit card debt, i.e. an award of one percent of card-incurred debt, the number X will be 100. It is also an option within the intended scope of the invention that the number X, and thereby the percentage of debt for which each coupon or voucher is awarded, may be varied from user-to-user and/or from time-to-time for promotional or reward purposes, or on the basis of a user's spending or payment or credit history and the like, or pursuant to any other criteria as a general matter of design choice.

The integer portion of the temporary variable I is next determined at block 132 and is assigned to the variable V, which represents the number of lottery ticket-exchangeable coupons or vouchers earned by the user in the current billing period. In block 134 the new value of the variable R is calculated by subtracting variable V from the temporary variable I and then multiplying the result by X. Variable R accordingly represents that dollar-amount portion of the eligible award balance L that was not used in the current billing period as the basis for an award of coupons to the user by reason of its comprising only a fraction of the number X. In preferred methods of the invention, this unused or remainder portion R is carried-over to the next billing period to be applied in calculating the number of coupons to which the user is entitled in that next period and, accordingly, the value of the variable R calculated at block 134 is stored for subsequent use at block 136.

Figure 4:
FIG. 4 depicts a coupon for distribution to a credit card user and redeemable for a lottery ticket in accordance with the present invention.

At this point in the inventive method, the system issues the earned coupons or vouchers that are to be distributed to the user, typically by including them with the current period's billing statement that is mailed to the user. The issuance of the coupons may be implemented in any of a number of alternative and, for the most part, equally suitable ways. Thus, the coupons may be directly printed by the system in response to the determination of the number of coupons earned by the particular user, either as separate documents or as integrated serated or tear-off portions of the billing statement. They may, on the other hand, be bulk printed independent of the exact number earned by any particular user, or otherwise supplied in bulk by an outside party (such as a State lottery commission or agency), and then merely distributed with the user's current billing statement in accordance with the number of such coupons V which the user is entitled to receive in that billing period. The coupons may also be mailed or distributed to the card user separate from the monthly billing statement. In any event, it is preferred and generally intended that each coupon bear a coded identification, as for example in bar code format, to validate its authenticity and, as described hereinbelow, to facilitate its subsequent exchange by a user for a lottery ticket. Where each coupon is printed for a particular user, information relating to the user's identity may additionally be encoded on the ticket, as well as any other data deemed useful in tracking or assessing, for example, the use of the coupons. It is further preferred that each coupon may be exchanged for a single lottery ticket, thereby providing the user with the enhanced flexibility to exchange the coupons for lottery tickets in as many different available games as desired. The coupons may also optionally bear an expiration date so as to encourage their use within a reasonable amount of time, such for example as three months or one year. Such a coupon is shown, by way of example, in FIG. 4. At block 138, therefore, V coupons or vouchers are printed or issued or distributed to the user.

At block 140, which may alternatively be carried out prior to or concurrently with the activity of block 138, the current period's billing statement is printed. It is expected and preferred that the statement include thereon an indication or report of the number V of coupons earned by the user during the statement period, and of the user's remaining (carry-over) eligible award balance R. The statement may also inform the user of the total number of coupons earned in the award program to date, and further include timely promotional information concerning the lottery games for which the coupons are exchangeable and/or other information or text intended to further encourage use of the credit card and/or the purchase of lottery tickets.

Finally, at block 142 the variables L and V are reset to zero, and the procedure terminates at block 144.

It should at this juncture be pointed out that the use of bar coded validation information on the coupons will facilitate their redemption by agents of a State lottery which employs automated scanners or readers through which the coupons may be "swiped". Such coding will similarly enable ready tracking of the use of such coupons, providing information useful in that regard to both the State and the credit card issuer.

In the aforedescribed method, the determination of the value of the variable L— i.e. of the total monetary amount upon which is based the pro rata number of coupons earned by the user in the current billing period—is grounded on the amount of debt that the user has accrued as of the billing period closing date. In a second embodiment of the invention, that determination is instead based upon the total of new payments against the user's account that have been received as of the closing date, to the extent that those payments do not exceed the user's outstanding balance or indebtedness to the card issuer or bank. Implementing this second embodiment employs the same method steps hereinabove described and illustrated in respect of the first form of the invention, except that the method step of block 128 (FIG. 2A) is replaced with the steps shown at blocks 146 to 152 in FIG. 2B.

Thus at block 146 (FIG. 2B), the value of the outstanding balance B is tested to determine whether it is less than zero. If the result of that interrogation is a negative response—indicating that the total P of user payments and credits does not exceed the user's current outstanding balance—then flow proceeds to block 148 at which the eligible award balance L is calculated or updated by adding the existing value of the variable L to the values of the variables R and P. Operation then passes to block 130 (FIG. 3) as in the first-described embodiment of the inventive methods.

A positive response to the block 146 inquiry, on the other hand, results in the alternative use of the formula shown in block 150 for calculating or updating the value of variable L. As should be apparent, the block 150 formula is used where the total user payments and credits exceeds the user's outstanding balance, so that the new outstanding balance is a negative number or, in other words, the user has a credit balance. Accordingly, in that case the value of L, otherwise calculated in accordance with the formula of block 148, is modified by adding thereto the current (negative) value of the outstanding balance variable B so as to reduce the eligible award balance L by the amount of the user's overpayment. The unused portion of the user's payments and credits—i.e. the user's credit balance –B, is then stored in the user payments variable P for use in the next billing period's coupon and statement processing operations. Flow thereafter proceeds to block 130 of FIG. 3 as hereinabove described.

A third form of the inventive method is similarly comprised of the flow charts of FIGS. 1, 2C and 3, and therefore merely requires a discussion of the newly-presented portion of FIG. 2C. This third embodiment is similar to that disclosed in respect of the immediately-preceding method, in that the calculation of the user's eligible award balance is based on user payments rather than, as in the first embodiment, incurred debts. However, in this last variation the calculation of the number of coupons to which the user is entitled is simplified in that the variable L is evaluated without regard to whether the total P of received payments exceeds the indebtedness actually due. As seen in FIG. 2C, this simplifies the calculation or updating of the variable L by obviating the need to initially test whether the outstanding balance B is positive and thereby advantageously results in enhanced processing speed, particularly as applied to the end-of-period processing of the accounts of a typically-large multiplicity of credit card users or subscribers. Thus, with reference to block 154 in FIG. 2C, the variable L is evaluated or updated by adding to the current, pre-existing value of variable L the values of the variables R and P. Processing then continues at block 130 (FIG. 3), as described hereinabove.

The present invention accordingly provides various methods for implementing an award to an authorized user of a credit card who transacts and thereby incurs debts with the card, such award being in the form of coupons or vouchers redeemable or exchangeable for tickets in State-run lottery games. The award thus consists of an opportunity for the user to recover at least a portion and, potentially, in excess of the total amount of the user-incurred debts through selective participation in the lottery games. And the user's chances or probability of recovering some such portion, or more, of those debts increases with increased use of the card and, correspondingly, the increased number of coupons that the user receives and that are redeemable for lottery tickets. The user is thereby further encouraged to use the issuer's credit card for the purpose of paying for goods and services, and thereby incurring debts on the card, and (in at least some methods of the invention) toward making payments to satisfy the user's outstanding balance, thus creating value for both the issuer of the card and for the State or authorized commission or agency which runs the lottery games in the form of increased profits.

Finally, although the invention has been described as providing the credit card user with coupons or vouchers redeemable for lottery tickets or entries of State-run lotteries, those skilled in the art will readily appreciate that the methods herein disclosed, and their equivalents, are equally applicable to any such lotteries—whether or not run by a State or jurisdictional authority—and other games of chance and the like.

Thus, while there have been shown and described and pointed out fundamental novel features of the invention as applied to several preferred embodiments thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A data processing method of implementing an award to an authorized user of a credit card who incurs debts on the card, said award comprising an opportunity to recover at least a portion and potentially in excess of a total amount of the incurred debts and said potential recovery being wholly unrelated in amount to debts actually incurred and to payments actually tendered by the user of the credit card, comprising the steps of:

storing in a data processing device an amount of each of one or more debts incurred on the credit card by an authorized user of the card;

summing in the data processing device the amounts of said stored one or more incurred debts to define a total amount of the authorized user's charged purchases and incurred debts and storing said total amount in the data processing device;

defining and storing in the data processing device a due date by which payment of said total amount is due;

storing in the data processing device a payment amount received in payment of the authorized user's stored incurred debts;

comparing, in the data processing device, the stored total amount and the stored payment amount to determine whether payment of said total amount has been received by the due date and, if not, (a) calculating and storing in the data processing device a finance charge on an unpaid portion of said total amount, and (b) adding in the data processing device said stored finance charge to said stored total amount of the authorized user's entered incurred debts to redefine said total amount, and storing said redefined total amount in the data processing device;

defining and storing in the data processing device a number representing a monetary amount for which the user earns a coupon redeemable by the user for a lottery ticket comprising a statistically-calculatable chance for an award to the user of a sum of money unrelated in amount to the total amount of the user's incurred debts and to the payment amount;

calculating in the data processing device a quantity of coupons earned by the user by dividing one of the stored payment amount and the stored total of the user's incurred debts and finance charges by said stored conversion number to define a numerical result, said quantity comprising an integer portion of said numerical result;

printing a plurality of coupons each indicating thereon redeemability of said each coupon for a lottery ticket, said coupon plurality being defined by said quantity; and distributing to the user said plurality of coupons redeemable for at least one lottery ticket.

2. A data processing method in accordance with claim 1, wherein each coupon carries a machine-readable representing redeemability of the coupon for a lottery ticket, further comprising the step of passing one of said distributed coupons through an automated reader to generate a lottery ticket in exchange for said one coupon.

3. A data processing method in accordance with claim 1, wherein said step of calculating the quantity of coupons earned by the user comprises dividing said received payment amount by said number to define said numerical result.

4. A data processing method in accordance with claim 1, further comprising the steps of:

subtracting in the data processing device said quantity from said numerical amount to define a difference, and multiplying in the data processing device said difference by said number to define an unused eligible award balance; and storing in the data processing device said unused eligible award balance for subsequent use in calculating an additional quantity of coupons earned by the user on the basis of one of future received payments and future incurred debts and finance charges.

* * * * *